(12) United States Patent
Takahashi (10) Patent No.: US 7,057,748 B2
(45) Date of Patent: Jun. 6, 2006

(54) INFORMATION PROCESSING APPARATUS AND METHOD THAT DETERMINES THE PRESENCE OR ABSENCE OF A PRINTER CONNECTED TO A NETWORK, AND STORAGE MEDIUM STORING PROGRAM THEREFOR

(75) Inventor: Yoshinori Takahashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/503,482

(22) Filed: Feb. 14, 2000

(65) Prior Publication Data
US 2003/0043395 A1 Mar. 6, 2003

Related U.S. Application Data

(62) Division of application No. 08/782,817, filed on Jan. 13, 1997, now Pat. No. 6,246,486.

(30) Foreign Application Priority Data
Jan. 18, 1996 (JP) ................................. 8-023488

(51) Int. Cl.
*G06F 15/00* (2006.01)

(52) U.S. Cl. ..................................... 358/1.13; 358/1.15

(58) Field of Classification Search ............... 358/1.13, 358/1.14, 1.15, 1.1, 468, 407, 402; 703/23, 703/24, 25, 26, 27, 28
See application file for complete search history.

(56) References Cited

U.S. PATENT DOCUMENTS

| 5,031,115 | A | | 7/1991 | Hayashi ....................... 395/101 |
| 5,220,674 | A | * | 6/1993 | Morgan et al. .............. 709/223 |
| 5,228,118 | A | | 7/1993 | Sasaki .......................... 395/112 |
| 5,353,388 | A | | 10/1994 | Motoyama ................... 395/117 |
| 5,580,177 | A | | 12/1996 | Gase et al. .................. 395/114 |
| 5,630,062 | A | * | 5/1997 | Okutsu ........................ 709/100 |
| 5,933,584 | A | * | 8/1999 | Maniwa ..................... 358/1.15 |

FOREIGN PATENT DOCUMENTS

| JP | 61-125663 | | 6/1986 |
| JP | 405181628 A | * | 7/1993 |

* cited by examiner

*Primary Examiner*—Gabriel I. Garcia
(74) *Attorney, Agent, or Firm*—Fitzpatrick, Cella, Harper & Scinto (57) ABSTRACT

An information processing apparatus is disclosed. A host computer makes a query to a selected printer connected to a network concerning a printer language supported by the printer. Then, print data is converted to match the printer language received in response to the above query, and the converted data is transmitted to the printer. This enables the user to achieve correct printing operations while the printer languages of the individual printers connected to the network are transparent to the user.

19 Claims, 7 Drawing Sheets

INFORMATION PROCESSING APPARATUS AND METHOD THAT DETERMINES THE PRESENCE OR ABSENCE OF A PRINTER CONNECTED TO A NETWORK, AND STORAGE MEDIUM STORING PROGRAM THEREFOR

This application is a division of application Ser. No. 08/782,817, filed on Jan. 13, 1997, now U.S. Pat. No. 6,246,486.

BACKGROUND OF THE INVENTION

1. Field of the Invention

The present invention relates to printer control performed in a network to which a plurality of printers are connected.

2. Related Background Art

Hitherto, printer control is performed in a network to which a plurality of printers are connected in such a manner that a network printer which is to perform a printing operation and a corresponding printer driver for converting print data received from an application program to a printer language are independently selected.

However, the above known type of printer control presents the following problems. If the printer language of a network printer which is to perform a printing operation does not match the printer language of the selected printer driver, the print data converted according to the printer language which does not fit the network printer is disadvantageously sent to the printer, thus causing incorrect character conversion, which prevents a correct printing operation. Further, if a network printer is newly connected to a network, it is necessary that a corresponding new printer driver be installed in each of the client computers on the network.

SUMMARY OF THE INVENTION

Accordingly, in view of the above-described background, it is an object of the present invention to achieve correct printing operations performed while printer languages for individual printers connected to a network are transparent to the user and also to eliminate the need for installing a printer driver into a client computer when a printer is newly connected to a network.

Further objects, features and advantages of the present invention will become apparent from the following description of the preferred embodiments with reference to the attached drawings.

DESCRIPTION OF THE PREFERRED EMBODIMENTS

First Embodiment

Embodiments of the present invention will now be described with reference to the drawings.

Figure 1:
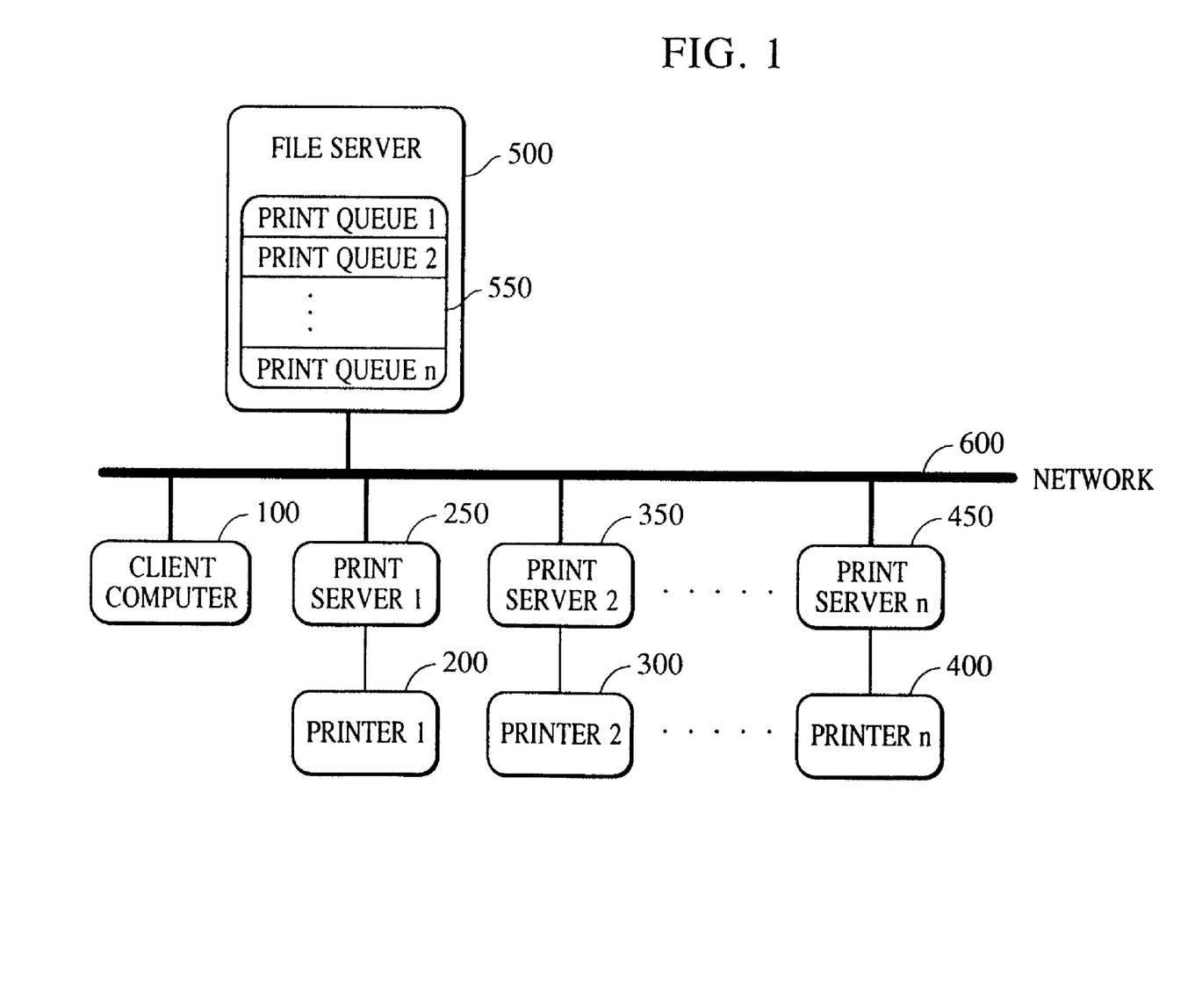
FIG. 1 is a block diagram of the system configuration by the application of a network print system according to first, second and third embodiments of the present invention.

FIG. 1 is a block diagram of a system configuration formed by the application of a network print system according to first, second and third embodiments of the present invention. It will now be assumed in FIG. 1 that n-number of printers and n-number of print servers are connected to a network 600. Printers 200, 300 and 400 are respectively connected to corresponding print servers 250, 350 and 450 by means of printer cables via interfaces (not shown), and convert print data received from the print servers 250, 350 and 450 to dot image data per page to print it page by page.

A client computer 100 is connected to the network 600 by a network cable via an interface (not shown). The client computer 100 is capable of running various programs, such as application programs, and is loaded with a printer driver which serves the function of sending to the network 600 a print job represented by the printer language corresponding to the printer selected to print the data. The printer driver is adapted to support a plurality of printer languages.

A file server 500, which is a computer loaded with a network operating system (OS), is connected to the network 600 by a network cable via an interface (unillustrated) so as to store files used in the network 600 and monitor the use of the network 600. The filer server 500 also contains print queues 550 for temporarily storing print jobs sent to the individual printers 200, 300 and 400. The number of the print queues 550 corresponds to the number of the printers connected to the network 600. The print servers 250, 350 and 450, which are connected to the network 600 by a network cable via an interface (unillustrated) and are also connected to the printers 200, 300 and 400 by printer cables via interfaces (not shown), sequentially send print job data to the corresponding printers 200, 300 and 400 if there are any print jobs stored in the associated print queues 550.

In this manner, according to the first through third embodiments, the functions are shared by the client computer 100, the print servers 250, 350 and 450, and the file server 500. This enhances the effective use of the client computer 100 and speeds up printing operations.

Figure 2:
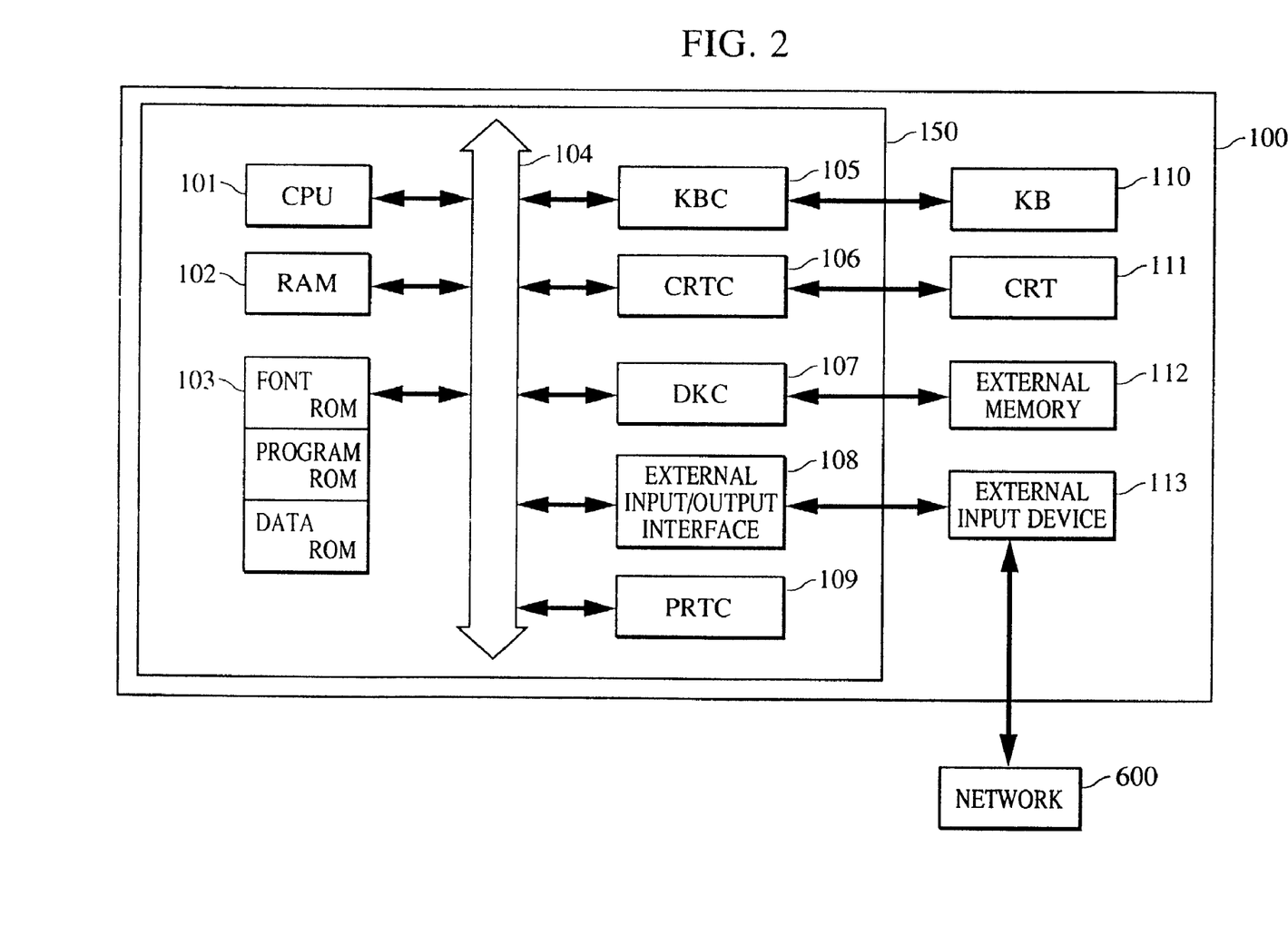
FIG. 2 is a block diagram illustrating the schematic configuration of the client computer shown in FIG. 1.

FIG. 2 is a block diagram illustrating the schematic configuration of the client computer 100. A central processing unit (CPU) 101 runs programs, such as application programs and printer driver programs, stored in an external memory 112, for example, a hard disk (HD) or a floppy disk (FD), connected to a disk controller (DKC) 107 so as to temporarily store in a RAM 102 information and files required for running the programs. The CPU 101 also controls various devices connected to a system bus 104.

Figure 4:
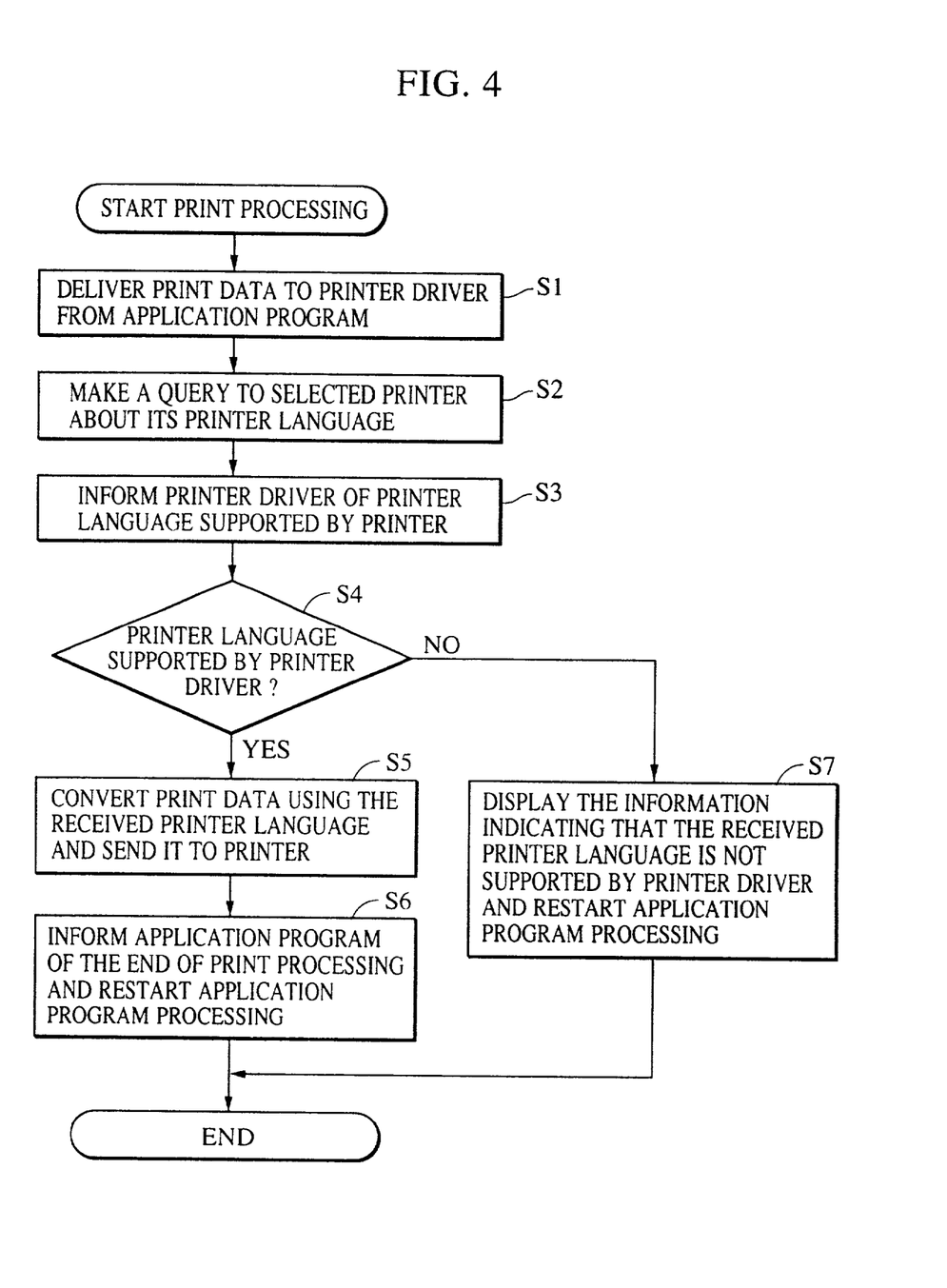
FIG. 4 is a flow chart illustrating print processing according to the first embodiment of the present invention.
Figure 5:
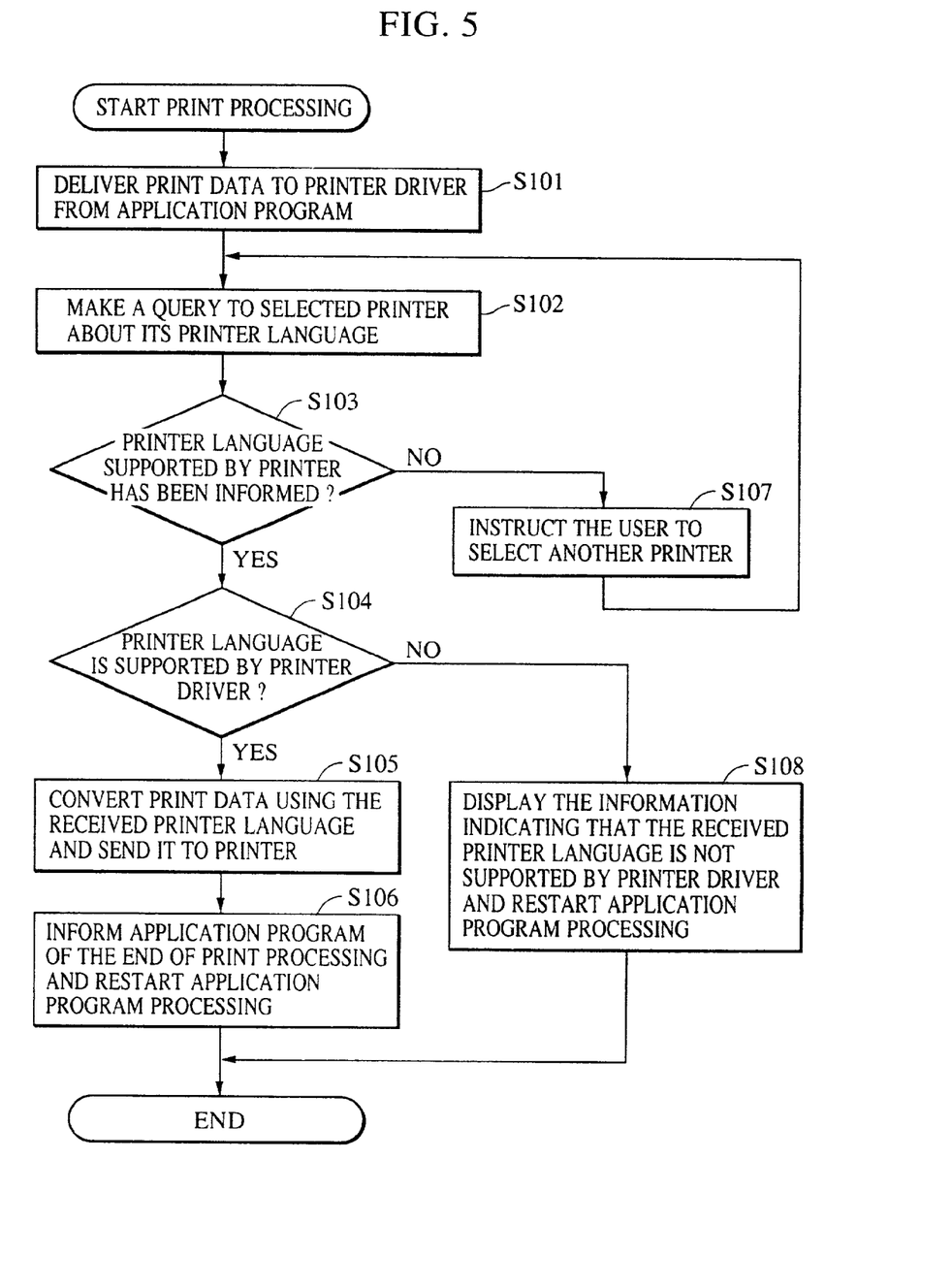
FIG. 5 is a flow chart illustrating print processing according to the second embodiment of the present invention.
Figure 6:
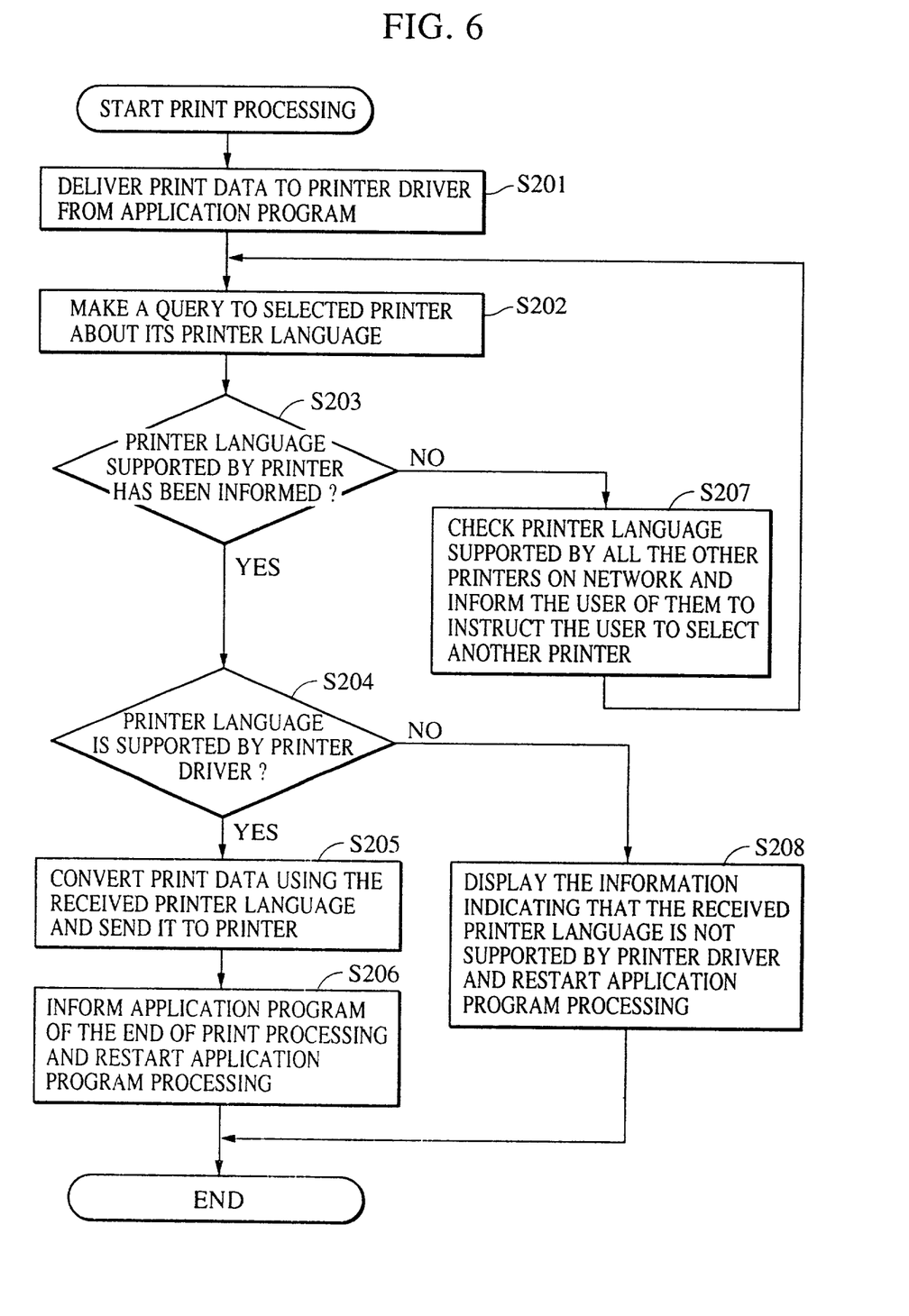
FIG. 6 is a flow chart illustrating print processing according to the third embodiment of the present invention.

A program ROM contained in a ROM 103 stores command information for running control programs, as illustrated by the flow charts of FIGS. 4, 5 and 6, stored in the CPU 101. Font data used in the above-described document processing is stored in a font ROM; and various data (for example, template data) is stored in a data ROM. The RAM 102 serves as a main storage device and a work area for the CPU 101.

A keyboard controller (KBC) 105 controls inputs from a keyboard 110 and from a pointing device (not shown). A CRT controller (CRTC) 106 controls the display of a CRT display (CRT) 111. The disk controller (DKC) 107 controls access to and from the external memory 112, such as a hard disk (HD) or a floppy disk (FD), which stores boot programs, application programs, printer driver programs, font data, user files, edit files, etc.

An external input/output interface 108 serves as an interface through which the printers 200, 300 and 400 are controlled via an external input device 113 and the network 600. A printer controller (PRTC) 109 equivalent to the aforedescribed printer driver serves the function of transmitting to the network 600 a print job indicated by a printer language corresponding to a printer selected among the printers 200, 300 and 400 by an application program.

Figure 3:
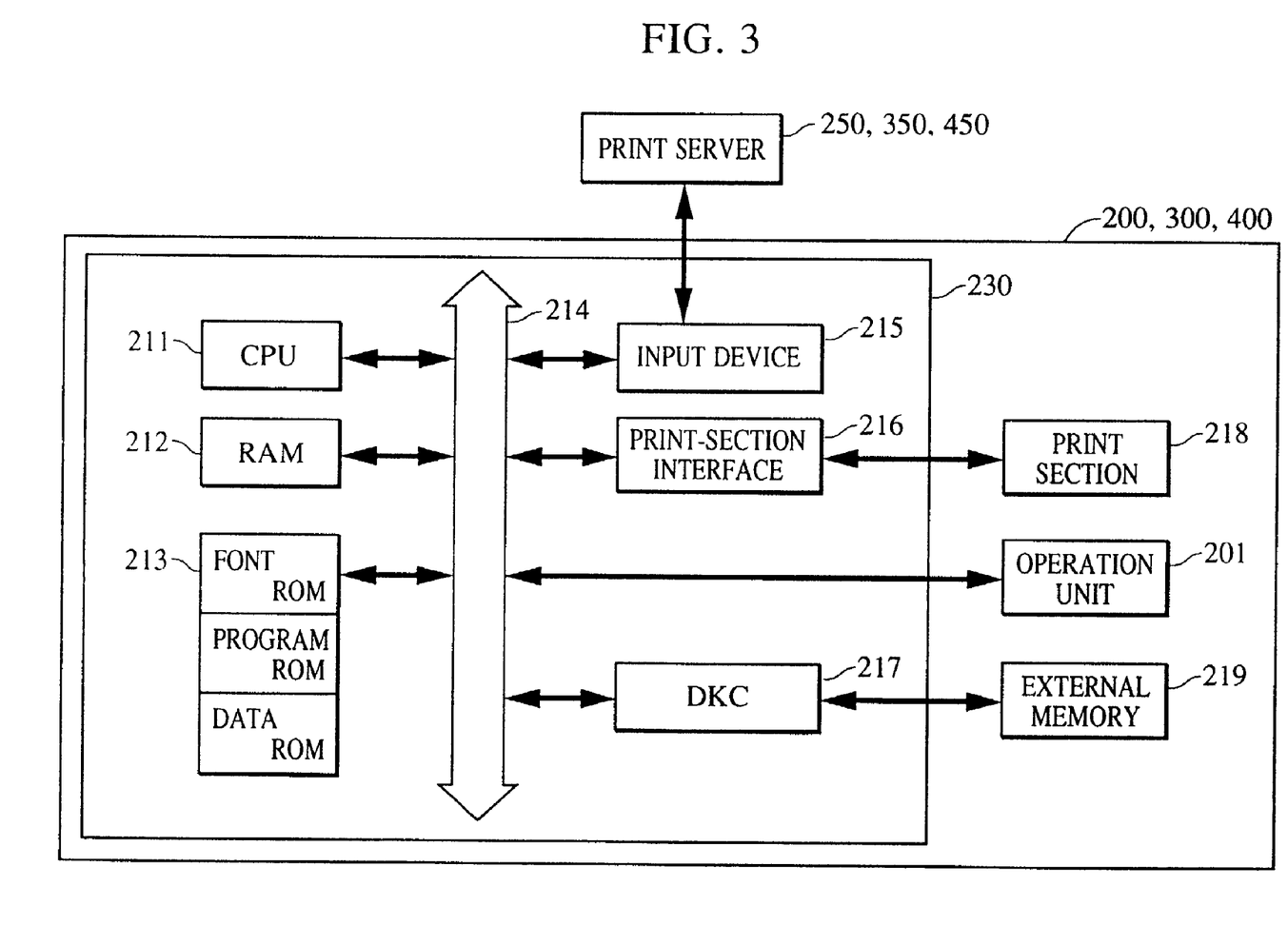
FIG. 3 is a block diagram of the schematic configuration of the printer shown in FIG. 1.

FIG. 3 is a block diagram illustrating the schematic configuration of each of the printers 200, 300 and 400. In the first through third embodiments, laser beam printers (LBP) are used as the printers 200, 300 and 400. However, other types of printers, such as bubble-jet printers and ink-jet printers, may be used as long as they have sufficient memory capacity to develop print data to a dot image and perform printing operations based on a predetermined printer language.

Contained in the printers 200, 300 and 400 shown in FIG. 3 is a printer control unit 230 for controlling the overall LBPs 200, 300 and 400 and also for analyzing character information received from the print servers 250, 350 and 450. A printer CPU 211 exercises overall control, based on control programs stored in a program ROM of a ROM 213, of access to and from various devices connected to a system bus 214 so as to output an image signal as output information to a print section (printer engine) 218 connected to the system bus 214 via a print-section interface 216. The control programs and other programs run by the CPU 211 are stored, as described above, in the program ROM of the ROM 213. Font data used for generating the above output information is stored in a font ROM; and information used by the print servers 250, 350 and 450 is stored in a data ROM if a printer without an external memory 219, such as a hard disk, is employed.

The CPU 211 is constructed to inform the print servers 250, 350 and 450 of the information contained in the corresponding printers 200, 300 and 400 via an input device 215. A RAM 212, which functions as a main storage device and a work area for the CPU 211, and its memory capacity is expandable by the use of an option RAM connected to an add-in port (not shown). The RAM 212 is used as an output-information expansion area, an environment-data storage area, an a non-volatile RAM (NVRAM), or the like. A disk controller (DKC) 217 controls access to and from the above-described external memory 219, such as a hard disk (HD) or an IC card. The external memory 219 is removably connected as an option and stores font data, emulation programs, form data, etc. An operation unit 201 contains various types of operation switches and LED displays.

The number of the aforedescribed external memory 219 is not restricted to one, and a plurality of external memories 219 may be provided, connectable to a plurality of option cards in addition to built-in fonts. The external memory 219 may be provided with an NVRAM (unillustrated) to store printer-mode setting information received from the operation unit 201.

The file server 500 is similar to the client computer 100 in its internal configuration as illustrated in FIG. 2. The file server 500 manages the network 600 by storing files used in the network 600 in a hard disk (not shown). Moreover, the print queues 550 associated with the printers 200, 300 and 400 are formed on the hard disk to temporarily store print jobs received from the client computer 100 in the file format. More than one hard disk and one disk controller 217 may be provided to ensure the reliability of the network 600.

The internal configurations of the print servers 250, 350 and 450 are also similar to the construction of the client computer 100 shown in FIG. 2. If there is any print data stored in the print queues 550, the print servers 250, 350 and 450 respectively extract the print jobs using the external input device 113 and respectively send the print data to the printers 200, 300 and 400 through printer cables connected to the printer controller (PRTC) 109. Computers are not necessarily used as print servers 250, 350 and 450, and mere print server functions may suffice. Alternatively, the print servers 250, 350 and 450 may be built into the corresponding printers 200, 300 and 400.

An explanation will now be given of the print processing in the first embodiment with reference to the flow chart of FIG. 4. In this embodiment, the program for executing print processing by the CPU 101 is contained in the printer driver program, which is stored in a storage medium, i.e., a floppy disk, through which the program is readable by the computer. This program is then stored in an external memory, such as a hard disk. Alternatively, it may be stored in advance in the program ROM of the ROM 103 contained in the client computer 100.

A storage medium for supplying program codes may use not only the above-described floppy disk or the ROM, but also an optical disk, a magneto-optical disk, a hard disk, a CD-ROM, magnetic tape, a non-volatile memory card, or the like. With this arrangement, the program codes per se read from the storage medium can implement a novel feature of the present invention, and thus, the storage medium for storing such program codes can constitute the present invention.

A reference will first be made to FIG. 4. In S1, the CPU 101 of the client computer 100 runs an application program to generate data to be printed and stores it in the RAM 102 and in a hard disk. The CPU 101 then suspends the processing of the application program and executes the processings in S2 and the following steps. More specifically, the CPU 101 runs a printer driver program and makes a query about the printer language supported by the printer selected from the printers 200, 300 and 400 connected to the network 600 for performing a printing operation. This query may be made to any of the corresponding printer, the print server, or the file server 500. It will now be assumed in this embodiment that the printer selected for performing a printing operation will be the printer 200. In S3, in response to the question asked in S2, the CPU 101 receives a reply concerning the printer language supported by the printer 200 from the printer 200, the print server 250 or the file server 500.

Then, the CPU 101 determines in S4 whether the received printer language is contained in the printer languages supported by the printer driver. If the answer in S4 is yes, the flow proceeds to S5 in which the CPU 101 converts the print data according to the printer language supported by the printer 200 so that the printer 200 can interpret the data, and sends the converted data to the printer 200. In S6, the CPU 101 ends the printer driver program and restarts the processing of the application program.

On the other hand, if it is found in S4 that the printer language supported by the printer 200 is not included in the printer languages supported by the printer driver, the flow proceeds to S7 in which the CPU 101 displays a message indicating the above information on the display and ends the printer driver program and restarts the processing of the application program.

In this manner, in the first embodiment, a query is made concerning the printer language of the selected printer to the printer, the associated print server or the file server, and, upon receiving the answer, the print data is sent in the form of the obtained printer language. Thus, the user is able to perform a correct printing operation while the printer languages of the individual printers connected to the network are transparent to the user.

Second Embodiment

Print processing of a second embodiment of the present invention will now be described while referring to the flow chart of FIG. 5. In this embodiment, the program for executing print processing by the CPU 101 is contained in the printer driver program, which is stored in a storage medium, i.e., a floppy disk, through which the program is readable by the computer. This program is then stored in an external memory, such as a hard disk. Alternatively, it may be stored in advance in the program ROM of the ROM 103 contained in the client computer 100.

In this embodiment, if the printer language supported by a selected printer is not notified by the printer, the corresponding print server or the file server, the CPU 101 instructs the user to select another printer by displaying a message indicating such an instruction.

More specifically, in S101 the CPU 101 of the client computer 100 runs an application program to generate data to be printed and stores it in the RAM 102 and in a hard disk. Then, the CPU 101 suspends the processing of the application program and runs the printer driver program to control the processings in S102 and the following steps. In the interests of simplicity, in this embodiment, as well as in the previous embodiment, the flow of this processing will be explained, assuming that the printer selected for printing is the printer 200.

In S102, the CPU 101 makes a query about the printer language supported by the selected printer 200 to the printer 200, the print server 250 or the file server 500 on the network 600. The CPU 101 then determines in S103 as to whether the printer language supported by the printer 200 has been received, in response to the above query, from the printer 200, the print server 250 or the file server 500. If the answer in S103 is yes, the flow proceeds to S104 in which the CPU 101 judges whether the printer language is included in the printer languages which can be interpreted by the printer driver stored in the external memory 112. If the response in S104 is yes, the flow further proceeds to S105 in which the CPU 101 converts the print data to match the printer language supported by the printer 200 and sends the converted data to the printer 200. Thereafter, in S106 the CPU 101 ends the printer driver program and restarts the processing of the application program.

In contrast, if it is found by the CPU 101 in S104 that the printer language supported by the printer 200 is not interpretable by the printer driver program which executes the program, the flow proceeds to S108 in which the CPU 101 displays on the display that the printer language of the printer 200 is not supported by the printer driver. The CPU 101 then ends the printer driver program and restarts the application program.

Referring back to S103, if the CPU 101 judges that the printer language supported by the printer 200 has not been sent to the client computer 100 from the printer 200, the print server 250 or the file server 500, the CPU 101 instructs the user to select another printer from the printers 300 and 400 by displaying a message indicating the above instruction. Then, the flow returns to S102.

According to the above description, in the second embodiment, if the printer language is not obtained after making an inquiry about the printer language of the selected printer to the printer, the corresponding print server or the file server, a message is given to the user to indicate that another printer should be selected. This makes it possible for the user to recognize that the printer selected by the user is incorrect, thereby enhancing ease of use.

Third Embodiment

An explanation will now be given of print processing of a third embodiment with reference to the flow chart of FIG. 6. In this embodiment, the program for executing print processing by the CPU 101 is contained in the printer driver program, which is stored in a storage medium, i.e., a floppy disk, through which the program is readable by the computer. This program is then stored in an external memory, such as a hard disk. Alternatively, it may be stored in advance in the program ROM of the ROM 103 contained in the client computer 100. For the purpose of brevity, in this embodiment, as well as in the foregoing embodiments, it will now be assumed that the printer 200 is determined as the printer selected for printing.

In this embodiment, if the printer language supported by the printer 200 is not reported by the printer 200, the print server 250 or the file server 500, the printer languages of all of the other printers 300 and 400 on the network 600 are checked and notified to the user, so that the user can be instructed to choose another printer 300 or 400.

More specifically, in S201 the CPU 101 of the client computer 100 runs an application program to produce data to be printed and stores it in the RAM 102 and in a hard disk. The CPU 101 then suspends the processing of the application program and runs the printer driver program to control the processings in S202 and the following steps. Namely, in S202 the CPU 101 which runs the printer driver program inquires as to the printer language supported by the printer 200 to the printer 200, the print server 205 or the file server 500 connected to the network 600. Subsequently, the CPU 101 makes a determination in S203 whether the printer language supported by the printer 200 has been received, in response to the above question in S202, from the printer 200, the print server 250 or the file server 500.

If the response in S203 is yes, the flow proceeds to S204 in which it is judged as to whether the printer language is contained in the printer languages interpretable by the printer driver program. If the answer in S204 is yes, the flow further proceeds to S205 in which the print data is converted to match the printer language of the selected printer 200 and sends the converted data to the printer 200. Then, in S206 the CPU 101 ends the printer driver program and restarts the application program.

On the other hand, if the CPU 101 judges in S204 that the received printer language is not interpretable by the printer driver program, the flow proceeds to S208 in which the CPU 101 displays on the display that the printer language is not supported by the printer driver. The CPU 101 then ends the printer driver program and restarts the application program.

If it is found in S203 that the printer language supported by the printer 200 has not been reported by the printer 200, the print server 250 or the file server 500, the printer languages of all of the other printers 300 and 400 on the network 600 are checked and notified to the user. An instruction is then provided to the user to select another printer 300 or 400. The flow then returns to S202.

According to the above description, in this embodiment, if the printer language is not reported after an inquiry is made about the printer language supported by the selected printer to the printer, the print server or the file server, the CPU 101 instructs the user to select another printer by displaying the printer languages of all of the other printers connected to the network. It is thus possible for the user to perform a printing operation with a desired printer even if the printer languages of the individual printers connected to the network are totally unknown to the user.

As discussed above, according to this embodiment, a query is made concerning the printer language of the selected printer to the printer, the print server or the file server, and the print data is converted to match the received printer language and sent to the printer. This makes it possible to perform a correct printing operation while the printer languages of the individual printers connected to the network are transparent to the user.

Fourth Embodiment

Figure 7:
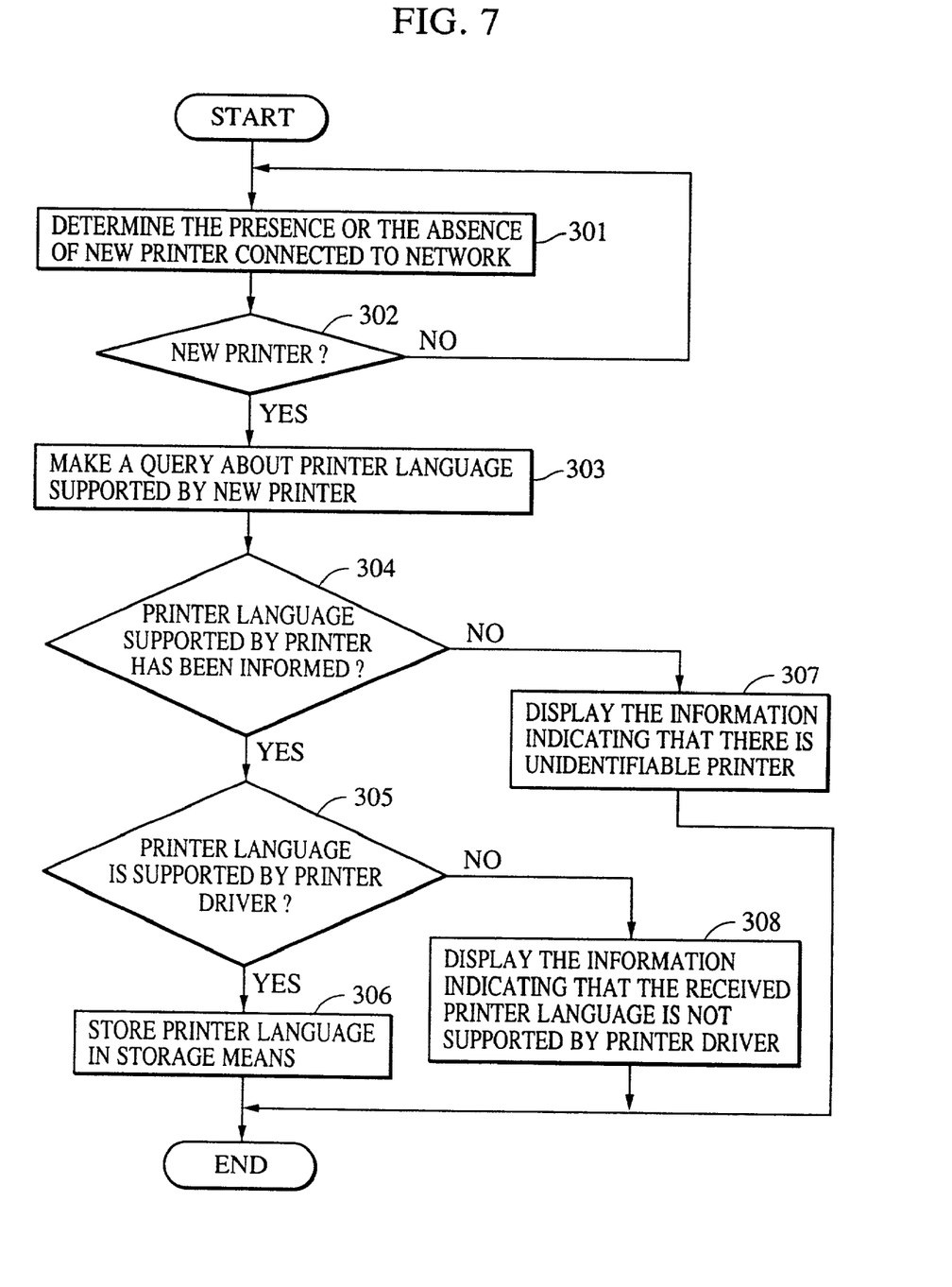
FIG. 7 is a flow chart illustrating print processing according to the fourth embodiment of the present invention.

A description will now be given with reference to the flow chart of FIG. 7 of print processing according to a fourth embodiment. In this embodiment, if a network printer is newly connected to a network, a client computer identifies the printer language supported by the new network printer.

More specifically, the client computer 100 identifies a network printer 700 (not shown) newly connected to the network 600 and inquires as to this printer 700 about its printer language. In this embodiment, the client computer 100 is adapted to store the devices, such as the print servers, the printer file server and the client computer, connected to the network 600 in the storage means, such as the RAM 102 or the external memory 112.

In S301, the CPU 101 of the client computer 100 determines the presence or absence of a new printer connected to the network 600 by inquiring about management information base (MIB) information to the network 600. If the CPU 101 identifies, upon a determination in S302, the presence of a new printer on the network 600, the flow proceeds to S303. If it is found in S302 that the presence of a new printer is denied, the flow returns to S301 by means such as providing a timer to count for a predetermined duration. Also, the processing in S301 may be executed only when the user gives a command instruction through the client computer 100.

In S303, the CPU 101 makes a query to the printer newly connected to the network 600, i.e., the printer 700 in this embodiment, about its printer language. It is then judged in S304 whether the printer language supported by the printer 700 has been sent in response to the above query. If the answer in S304 is yes, the flow proceeds to S305 in which a determination is made as to whether the received printer language is contained in the printer languages interpretable by the printer driver program. If the answer in S305 is yes, the flow further proceeds to S306 in which the CPU 101 stores the printer identifying information, such as the printer language supported by the printer 700, in the storage means, such as the external memory 112 or in the RAM 102 within the client computer 100. The CPU 101 then ends this processing.

In contrast, if it is found in S304 that the printer language supported by the printer 700 has not been sent in response to the question asked in S303, the CPU 101 displays in S307 on the display a message indicating the presence of an unidentifiable printer and then ends this processing.

If it is found in S305 that the received printer language is not interpretable by the printer driver program, the CPU 101 displays in S308 a message indicating such information on the display so as to end this processing.

According to the above description, in the fourth embodiment, the CPU 101 checks whether there is any printer newly connected to the network, and if the answer is yes, a query is made to the printer about its printer language. In response to this question, if it is determined that the received printer language is interpretable by the printer driver which executes this program, printer information, for example, the printer language, is stored in storage means within the client computer. This can obviate the need for the user to install a printer driver compatible with the new printer into the client computer.

As will be clearly understood from the foregoing description, the present invention offers the following advantages. Even if a printer is newly connected to a network, there is no need for the user to install a printer driver compatible with the new printer into all of the client computers on the network. Instead, the client computer can automatically determine whether a printer is newly connected to the network and further identify printer information, such as the printer language supported by the new printer, and store it in the client computer.

While the present invention has been described with reference to what are presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An information processing apparatus comprising:
   a determiner adapted to determine a presence or an absence of a printer connected to the network by sending an inquiry;
   an inquiry circuit adapted to make an inquiry about a printer language supported by the printer connected to the network by sending the inquiry about the printer language to the network; and
   a control unit responsive to whether information is or is not received about the printer language supported by the printer, wherein the information about the printer language is sent in response to the inquiry about the printer language;
   wherein in a case where said control unit does not receive the information about the printer language supported by the printer, said control unit is adapted to end processing of printer language support inquiry.

2. The apparatus according to claim 1, wherein said determiner determines a presence or an absence of a new printer connected to the network by inquiring about management information base information to the network.

3. The apparatus according to claim 1, wherein said determiner determines the presence or the absence of the printer connected to the network periodically.

4. The apparatus according to claim 1, wherein said determiner determines the presence or the absence of the printer connected to the network in response to a user's instruction.

5. The apparatus according to claim 1, wherein the printer language is used to represent a print job.

6. The apparatus according to claim 1, wherein print data is converted according to the printer language supported by the printer, so that the printer can interpret the print data.

7. An information processing method comprising the steps of:
   determining a presence or an absence of a printer connected to the network by sending an inquiry;
   making an inquiry about a printer language supported by the printer connected to the network by sending the inquiry about the printer language to the network; and
   controlling in response to whether information is or is not received about the printer language supported by the printer, wherein the information about the printer language is sent in response to the inquiry about the printer language;
   wherein in a case where the information about the printer language supported by the printer is not received, said controlling step ends processing of printer language support inquiry.

8. The method according to claim 7, wherein said determining step includes determining a presence or an absence of a new printer connected to the network by inquiring about management information base information to the network.

9. The method according to claim 7, wherein said determining step includes determining the presence or the absence of the printer connected to the network periodically.

10. The method according to claim 7, wherein said determining step includes determining the presence or the absence of the printer connected to the network in response to a user's instruction.

11. The method according to claim 7, wherein the printer language is used to represent a print job.

12. The method according to claim 7, wherein print data is converted according to the printer language supported by the printer, so that the printer can interpret the print data.

13. A computer-readable storage medium storing a program for implementing an information processing method, the program comprising:
   code for determining a presence or an absence of a printer connected to the network;
   code for making an inquiry about a printer language supported by the printer to the printer connected to the network by sending the inquiry about the printer language to the network; and
   code responsive to whether information is or is not received about the printer language supported by the printer, wherein the information about the printer language is sent in response to the inquiry about the printer language;
   wherein in a case where the information about the printer language supported by the printer is not received, said code is configured to end processing of printer language support inquiry.

14. The medium according to claim 13, wherein said code for determining includes code for determining a presence or an absence of a new printer connected to the network by inquiring about management information base information to the network.

15. The medium according to claim 13, wherein the program further comprises code for displaying on a display a message indicating presence of an unidentifiable printer in the case where the information about the printer language supported by the printer is not received.

16. The medium according to claim 13, wherein said code for determining includes code for determining the presence or the absence of the printer connected to the network periodically.

17. The medium according to claim 13, wherein said code for determining includes code for determining the presence or the absence of the printer connected to the network in response to a user's instruction.

18. The medium according to claim 13, wherein the printer language is used to represent a print job.

19. The medium according to claim 13, wherein print data is converted according to the printer language supported by the printer, so that the printer can interpret the print data.

* * * * *